(12) United States Patent
Du et al.

(10) Patent No.: US 8,658,726 B2
(45) Date of Patent: Feb. 25, 2014

(54) COMPOSITES OF POLYSILOXANE POLYMERS AND INORGANIC NANOPARTICLES

(71) Applicant: NanoGram Corporation, Milpitas, CA (US)

(72) Inventors: Hui Du, Milpitas, CA (US); Shivkumar Chiruvolu, San Jose, CA (US); Ang-Ling Chu, Cerritos, CA (US)

(73) Assignee: NanoGram Corporation, Milpitas, CA (US)

( * ) Notice: Subject to any disclaimer, the term of this patent is extended or adjusted under 35 U.S.C. 154(b) by 0 days.

(21) Appl. No.: 13/845,879

(22) Filed: Mar. 18, 2013

(65) Prior Publication Data

US 2013/0217821 A1 Aug. 22, 2013

Related U.S. Application Data

(60) Division of application No. 13/559,085, filed on Jul. 26, 2012, now Pat. No. 8,404,771, which is a continuation of application No. 12/650,778, filed on Dec. 31, 2009, now Pat. No. 8,314,176.

(60) Provisional application No. 61/143,206, filed on Jan. 8, 2009.

(51) Int. Cl.
*C08K 3/22* (2006.01)
*C08K 3/28* (2006.01)

(52) U.S. Cl.
USPC .................................. 524/426; 524/430

(58) Field of Classification Search
None
See application file for complete search history.

(56) References Cited

U.S. PATENT DOCUMENTS

| 2,793,197 A | * | 5/1957 | Brown .................. 106/287.14 |
| 4,061,503 A | | 12/1977 | Berger et al. |
| 4,151,154 A | | 4/1979 | Berger |
| 4,680,204 A | | 7/1987 | Das et al. |
| 4,810,305 A | * | 3/1989 | Braun et al. .................. 106/499 |
| 4,828,695 A | | 5/1989 | Yamamura et al. |
| 4,832,944 A | * | 5/1989 | Socci et al. ..................... 424/61 |
| 4,842,832 A | | 6/1989 | Inoue et al. |
| 4,844,578 A | | 7/1989 | Pierini et al. |
| 4,927,464 A | | 5/1990 | Cowie et al. |
| 4,955,692 A | | 9/1990 | Merlin et al. |

(Continued)

FOREIGN PATENT DOCUMENTS

| EP | 0520217 B1 | 12/1992 |
| EP | 0776862 A1 | 6/1997 |

(Continued)

OTHER PUBLICATIONS

Technical data sheet for SF1555 by Momentive, 4 pages, 2013.*

(Continued)

*Primary Examiner* — Robert S Loewe
(74) *Attorney, Agent, or Firm* — Dardi & Herbert, PLLC; Nikhil Patel; Peter S. Dardi (57) ABSTRACT

Desirable composites of polysiloxane polymers and inorganic nanoparticles can be formed based on the appropriate selection of the surface properties of the particles and the chemical properties of the polymer. High loadings of particles can be achieved with good dispersion through the polymer. The composites can have good optical properties. In some embodiments, the inorganic particles are substantially free of surface modification.

13 Claims, 4 Drawing Sheets

(56) References Cited

U.S. PATENT DOCUMENTS

| | | | |
|---|---|---|---|
| 4,972,008 A | 11/1990 | Lee et al. | |
| 5,035,748 A * | 7/1991 | Burow et al. | 106/499 |
| 5,049,371 A | 9/1991 | Rinn et al. | |
| 5,068,056 A | 11/1991 | Robb | |
| 5,075,206 A | 12/1991 | Noda et al. | |
| 5,108,201 A | 4/1992 | Matsuura et al. | |
| 5,130,362 A | 7/1992 | Prasad et al. | |
| 5,270,076 A | 12/1993 | Evers | |
| 5,314,947 A | 5/1994 | Sawaragi | |
| 5,322,888 A | 6/1994 | Kato et al. | |
| 5,372,749 A | 12/1994 | Li et al. | |
| 5,378,789 A | 1/1995 | Raleigh et al. | |
| 5,443,811 A | 8/1995 | Karvinen | |
| 5,447,708 A | 9/1995 | Helble et al. | |
| 5,470,910 A | 11/1995 | Spanhel et al. | |
| 5,494,949 A | 2/1996 | Kinkel et al. | |
| 5,497,445 A | 3/1996 | Imoto | |
| 5,501,732 A | 3/1996 | Niedenzu et al. | |
| 5,556,613 A * | 9/1996 | Arnaud et al. | 424/64 |
| 5,565,041 A | 10/1996 | Hiraoka et al. | |
| 5,623,011 A | 4/1997 | Bernard | |
| 5,654,090 A | 8/1997 | Kayanoki | |
| 5,683,501 A | 11/1997 | Tomihisa et al. | |
| 5,698,309 A | 12/1997 | Dallmann et al. | |
| 5,717,051 A | 2/1998 | Hiraoka et al. | |
| 5,777,433 A | 7/1998 | Lester et al. | |
| 5,789,326 A | 8/1998 | Hansen et al. | |
| 5,807,364 A | 9/1998 | Hansen | |
| 5,837,804 A | 11/1998 | Yamagishi et al. | |
| 5,840,111 A | 11/1998 | Wiederhoft et al. | |
| 5,850,498 A | 12/1998 | Shacklette et al. | |
| 5,853,809 A | 12/1998 | Campbell et al. | |
| 5,857,039 A | 1/1999 | Bosc et al. | |
| 5,902,569 A | 5/1999 | Oshima et al. | |
| 5,935,890 A | 8/1999 | McLaughlin et al. | |
| 5,952,125 A | 9/1999 | Bi et al. | |
| 5,958,348 A | 9/1999 | Bi et al. | |
| 5,965,299 A | 10/1999 | Khan et al. | |
| 5,968,652 A | 10/1999 | Hanggi et al. | |
| 5,989,111 A | 11/1999 | Lamphere et al. | |
| 5,989,514 A | 11/1999 | Bi et al. | |
| 5,990,024 A | 11/1999 | Blum et al. | |
| 5,997,795 A | 12/1999 | Danforth et al. | |
| 6,001,326 A | 12/1999 | Kim et al. | |
| 6,002,522 A | 12/1999 | Todori et al. | |
| 6,005,707 A | 12/1999 | Berggren et al. | |
| 6,026,209 A | 2/2000 | Rhee et al. | |
| 6,080,337 A | 6/2000 | Kambe et al. | |
| 6,088,492 A | 7/2000 | Kaneko et al. | |
| 6,091,537 A | 7/2000 | Sun et al. | |
| 6,091,879 A | 7/2000 | Chan et al. | |
| 6,106,798 A | 8/2000 | Kambe et al. | |
| 6,107,364 A | 8/2000 | Fong et al. | |
| 6,136,287 A | 10/2000 | Horne et al. | |
| 6,136,891 A | 10/2000 | Chopin et al. | |
| 6,136,905 A | 10/2000 | Suzuki et al. | |
| 6,139,626 A | 10/2000 | Norris et al. | |
| 6,144,795 A | 11/2000 | Dawes et al. | |
| 6,193,936 B1 | 2/2001 | Gardner et al. | |
| 6,200,674 B1 | 3/2001 | Kumar et al. | |
| 6,211,931 B1 | 4/2001 | Fukao et al. | |
| 6,225,007 B1 | 5/2001 | Horne et al. | |
| 6,229,949 B1 | 5/2001 | Ido et al. | |
| 6,236,774 B1 | 5/2001 | Lackritz et al. | |
| 6,261,469 B1 | 7/2001 | Zakhidov et al. | |
| 6,282,335 B1 | 8/2001 | Losch et al. | |
| 6,311,004 B1 | 10/2001 | Kenney et al. | |
| 6,329,058 B1 | 12/2001 | Arney et al. | |
| 6,335,061 B1 | 1/2002 | Kanamori et al. | |
| 6,339,030 B1 | 1/2002 | Constant et al. | |
| 6,387,531 B1 | 5/2002 | Bi et al. | |
| 6,391,494 B2 | 5/2002 | Reitz et al. | |
| 6,407,156 B1 | 6/2002 | Hagihara et al. | |
| 6,432,526 B1 | 8/2002 | Arney et al. | |
| 6,433,931 B1 | 8/2002 | Fink et al. | |
| 6,442,321 B1 | 8/2002 | Berini | |
| 6,482,374 B1 | 11/2002 | Kumar et al. | |
| 6,506,493 B1 | 1/2003 | Kumar et al. | |
| 6,534,044 B1 | 3/2003 | Wada et al. | |
| 6,534,615 B2 | 3/2003 | Shafer et al. | |
| 6,593,417 B1 | 7/2003 | Anderson et al. | |
| 6,599,631 B2 | 7/2003 | Kambe et al. | |
| 6,607,706 B1 | 8/2003 | Kumar et al. | |
| 6,673,435 B1 | 1/2004 | Tashiro et al. | |
| 6,692,660 B2 | 2/2004 | Kumar | |
| 6,706,795 B1 | 3/2004 | Garti et al. | |
| 6,726,990 B1 | 4/2004 | Kumar et al. | |
| 6,849,334 B2 | 2/2005 | Horne et al. | |
| 6,881,490 B2 | 4/2005 | Kambe et al. | |
| 6,921,576 B2 | 7/2005 | Terauchi et al. | |
| 6,921,788 B1 | 7/2005 | Izawa et al. | |
| 6,952,504 B2 | 10/2005 | Bi et al. | |
| 7,018,458 B2 * | 3/2006 | Knott et al. | 106/31.6 |
| 7,074,488 B2 | 7/2006 | Pickering et al. | |
| 7,091,154 B2 | 8/2006 | Ohmori et al. | |
| 7,101,427 B2 * | 9/2006 | Dransfield et al. | 106/401 |
| 7,226,966 B2 | 6/2007 | Kambe et al. | |
| 7,531,234 B2 | 5/2009 | Nakamura et al. | |
| 7,792,406 B2 | 9/2010 | Kambe et al. | |
| 7,816,439 B2 | 10/2010 | Kambe et al. | |
| 2002/0192137 A1 | 12/2002 | Chaloner-Gill et al. | |
| 2002/0192476 A1 | 12/2002 | Kambe et al. | |
| 2003/0031438 A1 | 2/2003 | Kambe et al. | |
| 2003/0096102 A1 | 5/2003 | Yoshihara et al. | |
| 2003/0185771 A1 | 10/2003 | Kamei et al. | |
| 2003/0194550 A1 | 10/2003 | Perrine et al. | |
| 2003/0203205 A1 * | 10/2003 | Bi et al. | 428/402 |
| 2004/0046501 A1 | 3/2004 | Hayashi | |
| 2004/0091440 A1 | 5/2004 | Kamei et al. | |
| 2004/0156809 A1 | 8/2004 | Ono et al. | |
| 2004/0186224 A1 | 9/2004 | Minemura et al. | |
| 2005/0003220 A1 | 1/2005 | Kitahara et al. | |
| 2005/0187112 A1 | 8/2005 | Goodhue, Jr. et al. | |
| 2005/0203227 A1 | 9/2005 | Kuhnle et al. | |
| 2006/0165629 A1 | 7/2006 | Kamei et al. | |
| 2006/0204745 A1 | 9/2006 | Jones et al. | |
| 2006/0216259 A1 | 9/2006 | Haubennestel et al. | |
| 2006/0228314 A1 * | 10/2006 | Patil et al. | 424/64 |
| 2007/0003694 A1 | 1/2007 | Chiruvolu et al. | |
| 2007/0036962 A1 | 2/2007 | Sasaki et al. | |
| 2007/0071980 A1 | 3/2007 | Kamei et al. | |
| 2007/0185261 A1 * | 8/2007 | Lee et al. | 524/588 |
| 2007/0221939 A1 | 9/2007 | Taskar et al. | |
| 2008/0090947 A1 * | 4/2008 | Shin et al. | 524/131 |
| 2008/0150184 A1 | 6/2008 | Chiruvolu et al. | |
| 2008/0199687 A1 | 8/2008 | Chiruvolu et al. | |
| 2008/0292711 A1 * | 11/2008 | Berg-Schultz et al. | 424/497 |
| 2009/0191273 A1 * | 7/2009 | Kessell et al. | 424/489 |
| 2010/0102700 A1 | 4/2010 | Jaiswal et al. | |

FOREIGN PATENT DOCUMENTS

| | | |
|---|---|---|
| JP | 61-272264 | 12/1986 |
| JP | 2004-537767 | 12/2004 |
| JP | 2006-299251 | 11/2006 |
| JP | 2007-196224 | 8/2007 |
| WO | 96/28137 A1 | 9/1996 |
| WO | 98/35248 A1 | 8/1998 |
| WO | 00/04593 A1 | 1/2000 |
| WO | 01/32799 A1 | 5/2001 |
| WO | 01/81079 A1 | 11/2001 |

OTHER PUBLICATIONS

Al-Mawlawi et al., "Electrochemical fabrication of metal and semi-conductor nano-wire arrays," in Proc. Symp. Nanostructured Mater. Electrochm., 187th Meeting Electrochem. Soc., Reno, NV, May 21-26, 1995, Electrochem. Soc. 95(8):262-273 (1995).

Al-Mawlawi et al., "Nanowires formed in anodic oxide nanotemplates," J. Materials Research, 9:1014-1018 (Apr. 1994).

Bi et al., "Nanocrystalline α-Fe, Fe3C, and Fe7C3 produced by CO2 laser pyrolysis," J. Mater. Res. 8(7):1666-1674 (Jul. 1993).

(56) References Cited

OTHER PUBLICATIONS

Bi et al., "Synthesis of nanocrystalline Fe-based particles by CO2 laser pyrolysis," Material Research Society Symposium Proceedings, 286:161-166 (1993).
Cannon et al., "Sinterable Ceramic Particles From Laser-Driven Reactions: II, Powder Characteristics And Process Variables", Journal of the American Ceramic Society, 65(7):330-335 (Jul. 1982).
Encyclopedia of Polymer Science and Engineering, vol. 4, Wiley-Interscience, Edited by Mark et al., pp. 288-289, 1986.
Product information sheet for micro titanium dioxide, http://www.tayca.co.jp/english/products/micro_titanium/spec.html, 3 pages, 2009.
Watanabe et al., "Polymer arrayed-waveguide grating multiplexer with wide tuning range," Electronics Letters, 33 (18):1547-1548 (Aug. 28, 1997).
Yang et al, "Hierarchically Ordered Oxides," Science, 282:2244-2246 (Dec. 18, 1998).
Zimmerman et al., "High refractive index films of polymer nanocomposite," J. Mater. Res., 8(7):1742-1748 (Jul. 1993).
International Search Report and Written Opinion (PCT/US2009/069919) dated Aug. 13, 2010 (15 pages).
Office Action from copending Japanese application 2011-545374 dated Jun. 27, 2013 (19 pages with translation).

* cited by examiner

Fig. 4

COMPOSITES OF POLYSILOXANE POLYMERS AND INORGANIC NANOPARTICLES

CROSS REFERENCE TO RELATED APPLICATIONS

This application is a divisional of application Ser. No. 13/559,085, filed Jul. 26, 2012 to Du et al., entitled "Composites of Polysiloxane Polymers and Inorganic Nanoparticles," now U.S. Pat. No. 8,404,771, which is a continuation of U.S. patent application Ser. No. 12/650,778, filed Dec. 31, 2009 now U.S. Pat. No. 8,314,176, to Du et al., entitled "Composites of Polysiloxane Polymers and Inorganic Nanoparticles," which claims priority to U.S. provisional patent application Ser. No. 61/143,206, filed on Jan. 8, 2009, to Du et al., entitled "Composites of Polysiloxane Polymers and Inorganic Nanoparticles," all of which are incorporated herein by reference.

FIELD OF THE INVENTION

The invention relates to composites of polysiloxane polymers and inorganic nanoparticles, especially in which the nanoparticles are well dispersed within the polymer matrix. The invention further relates to method for forming composites of polysiloxane polymers and inorganic nanoparticles.

BACKGROUND OF THE INVENTION

Composites can be desired materials for a range of applications because they combine desirable properties of the individual materials and can provide unique properties relative to the individual materials. Polymers generally can provide a range of advantageous processing approaches while providing a reasonable range of available properties through the selection of the polymer composition. Similarly, inorganic materials can introduce various desirable mechanical and physical properties. In general, commercial applications provide growing demands on material properties.

SUMMARY OF THE INVENTION

In a first aspect, the invention pertains to a composite composition comprising a first polysiloxane polymer and inorganic particles, wherein the inorganic particles have an average particle size of no more than about 250 nm and are substantially free of organic surface modification distinct from the polysiloxane polymer. In some embodiments, the inorganic particles comprise a metal oxide, a metal nitride or a combination thereof.

In a further aspect, the invention pertains to a method for forming a composite, the method comprising the step of combining well dispersed inorganic particles in a dispersant liquid with a first polysiloxane polymer in a suitable solvent for solubilizing the first polysiloxane polymer to form a blend. Generally, the inorganic oxide particles have an average particle diameter of no more than about 250 nm and substantially no organic surface modification. In some embodiments the inorganic particles comprise a metal oxide, a metal nitride or a combination thereof.

In another aspect, the invention pertains to a composite composition comprising a first polysiloxane polymer, a second polysiloxane polymer and inorganic particles. Generally, the inorganic particles have an average particle size of no more than about 250 nm. In some embodiments, the first polysiloxane polymer has compatible functional groups that have stable interactions with the inorganic particles, and the second polysiloxane polymer does not have compatible functional groups. In some embodiments, the inorganic particles comprise a metal oxide, a metal nitride or a combination thereof.

In additional aspects, the invention pertains to a method for the formation of a composite, the method comprising the steps of combining well dispersed inorganic particles with a first polysiloxane polymer in a suitable solvent for solubilizing the first polysiloxane polymer to form a blend and combining a second polysiloxane polymer with the blend of the inorganic particles and the first polysiloxane polymer. Generally, the inorganic oxide particles have an average particle diameter of no more than about 250 nm. The first polysiloxane polymer can comprise compatible functional groups that have stabilizing interactions with the inorganic particles. In some embodiments, the inorganic particles comprise a metal oxide, a metal nitride or a combination thereof.

DETAILED DESCRIPTION OF THE INVENTION

Significant loadings of inorganic particles can be introduced into composites formed with siloxane polymers with a high level of uniformity of the particles within the composite. In general, it is difficult to combine inorganic particles with some siloxane polymers due to the chemical incompatibility of the two materials. However, it has been further found that introduction of appropriately selected functional groups onto the siloxane polymers can improve the compatibility of the inorganic particles with the polymer so that well blended composites can be formed at loading up to high levels. The selected functional groups can be added as terminal groups and/or branch groups as well as in association with certain monomers within a copolymer and/or a polymer blend. The inorganic particles may or may not be surface modified. In particular, it has been surprisingly found that inorganic particles without substantial organic surface modification can be incorporated into appropriate siloxane polymers at high particle loadings using the methods described herein. In some embodiments, a polymer blend can comprise an oligomer or oligomers selected to be chemically compatible with the inorganic particles. The dispersion of the inorganic particles within the polysiloxane polymer can be accomplished at a level that provides for very good optical properties of the resulting composites, although the composites can be used for a range of applications along with optical applications.

For composites formed with polydimethylsiloxane, it has been found that approaches based on the surface modification of the inorganic particles generally have not achieved the desired results with respect to high inorganic particle loadings with good dispersion of the inorganic particles. It has been discovered that the appropriate engineering of the polymer properties with the surface properties of the inorganic particles provides for good dispersion of the inorganic particles within the polysiloxane polymers, which can be maintained even at high loadings. Thus, the composites described herein comprise polysiloxane polymers or oligomers with compatible functional groups that stabilize the inorganic particles within the polymer matrix to form a well blended composite. The functional groups for the polymers can be introduced through the selection of the particular polymer, certain monomers within a copolymer and/or through the use of a polymer blend. Similarly, the inorganic particles can be surface modified to introduce appropriate surface chemistry to the inorganic particles.

Polysiloxane polymers, which are also referred to as silicone, have found commercial applicability based on the flexibility of the polymers. Silicone rubbers and other polysiloxane resins are used to form encapsulants, coatings, and the like. In general, these polymers have a high degree of thermal stability, oxidative stability and chemical resistance. Inorganic particles can introduce desired mechanical, optical or functional properties to the composite, while exploiting the desired properties of the polysiloxanes. The polysiloxane polymers can be crosslinked or cured to provide desired physical properties following the association with the inorganic particles.

It has been discovered that highly dispersed inorganic particles within a composite can result in a composite material that has the appearance with respect to certain properties of a homogenous material with the hybrid properties of the composite. In general, a particular property has a distance scale associated with that property that determines the distance scale on which the dispersion of the particles within the polymer matrix should appear uniform for the material to look relatively homogenous with respect to that property. Thus, it is desirable for the particles to be relatively non-aggregated such that the clusters are not too large. Also, it is desirable for the particles to be relatively uniformly dispersed. Then, the composite can be transparent with little scattering. Some lack of uniformity in the particle dispersion can result in some scattering or other corresponding appearance of inhomogeneity. Improved optical properties as a result of more uniform dispersion of inorganic particles within a polymer composite is described further in published U.S. Patent Application 2008/0150184A to Chiruvolu et al., entitled "Composites of Polymers and Metal/Metalloid Oxide Nanoparticles and Methods for Forming These Composites," incorporated herein by reference.

The composites comprise inorganic particles or a combination thereof dispersed within a polysiloxane polymer or a combination thereof. The composite can further comprise relatively small amounts of additives, such as antioxidants, viscosity modifiers and the like. In general, values of the inorganic particle loading within the composite can be selected based on the composite properties desired for the selected application and the properties of the various components of the composite. In some embodiments, low inorganic particle loadings are sufficient. However, in some embodiments, the composite comprises at least about 5 weight percent inorganic particles, in further embodiments at least about 10 weight percent, in other embodiments from about 20 weight percent to about 75 weight percent inorganic particles and in additional embodiments from about 25 weight percent to about 70 weight percent. A person of ordinary skill in the art will recognize that additional ranges of particle loadings within the explicit ranges above are contemplated and are within the present disclosure.

In some embodiments, the composite comprises a plurality of polysiloxane polymers, in which the distinct polymers have different chemical compositions. Specifically, the polymer blend can comprise 2 distinct polymers, 3 distinct polymers or more than 3 distinct polymers. For example, one polysiloxane polymer can have a functional group that facilitates formation of a uniform composite with the appropriate inorganic particles. The use of a polymer blend can provide for overall desirable polymer properties while also providing for relatively uniform incorporation of the inorganic particles into the composite.

Generally, for polymer blends the total amount of polysiloxane polymer comprises at least about 15 weight percent polysiloxane polymer compatible with the inorganic particles, in other embodiments at least about 20 weight percent, in further embodiments from about 25 weight percent to about 95 weight percent and in additional embodiments from about 30 weight percent to about 80 weight percent polysiloxane polymer compatible with the inorganic particles. In some embodiments, one of the polysiloxane polymers of the blend can be an oligomer, i.e., a lower molecular weight polymer, as described further below. The oligomer can have functional groups such that the oligomer is compatible with the inorganic particles. In embodiments with polysiloxane oligomers, the composite can generally comprise at least about 1 weight percent oligomer, in further embodiments at least about 3 weight percent oligomer, in other embodiments from about 4 weight percent to about 80 weight percent oligomer, in additional embodiment from about 5 weight percent to about 60 weight percent oligomer and in some embodiments from about 7 weight percent to about 25 weight percent oligomer. A person of ordinary skill in the art will recognize that additional ranges within the explicit concentration ranges above are contemplated and are within the present disclosure.

With respect to oligomers with desirable functional groups, it is noted that polysiloxane oligomers with epoxy groups are commercially available. For example, an epoxy-siloxane oligomer UV 9400 is available from GE Silicones. The epoxy group provides a polar group to the polymer blend, and the epoxy group can provide for subsequent crosslinking. Epoxy silanes provide similar properties. It has also been found that blends of polysiloxanes with appropriate amounts of epoxy-silane are compatible and blend well with metal oxide particles as described herein without any further surface modification.

The inorganic particles may or may not be surface modified for incorporation into a polymer composite. A surface modifying agent may or may not chemically bond with the inorganic particle. If the surface modification agent does not chemically bond with the particles, the surface modification agent may associate with the surface due to hydrogen bonding, electrostatic attraction, non-specific interactions and/or entropic effects. As used herein, chemical bonding refers to bonds with some significant covalent character, which can include, for example, bonds found in organic compositions, metal-ligand bonds and the like. Certain functional groups have the ability to form chemical bonds with inorganic particles. These functional groups can form the basis for bonding surface modification agents and/or polymers to the inorganic particle surfaces.

Un-modified inorganic particles, i.e., without any substantial surface modification with an organic composition, can have particular surface properties, which may depend on the method of synthesis and the treatment of the particles following synthesis. However, metal oxide particles, metal nitride particles and other inorganic particles can have a polar surface, such as if the surface has terminal hydroxide or amine groups. Thus, polar functional groups would be expected to have stabilizing interactions with these inorganic particles if they have a polar surface. If the particles are surface modified, the surface modification agent introduces different functionality to the inorganic particle surface. This functionality can be polar, non-polar or hydrophobic, aromatic or the like. The particles are free of substantial modification if the particles are unmodified or have a very low degree of surface modification such that the properties of the particles in dispersions are unchanged based on any reasonable measurement from the completely unmodified form of the particles.

In general, desirable inorganic particles for the composites are submicron, i.e., the particle collections generally have an average primary particle diameter of no more than about 1 micron, which is equal to 1000 nanometers (nm), in some embodiments no more than about 250 nm, in further embodiments no more than about 100 nm, in other embodiments from about 2 nm to about 50 nm and in additional embodiments from about 2 nm to about 25 nm. A person of ordinary skill in the art will recognize that additional ranges of average particle diameter within the explicit range above are contemplated and are within the present disclosure.

In some embodiments, the particles are very uniform in particle size such that the particle collections have corresponding uniformity of properties. In particular, laser pyrolysis as well as some other synthesis methods can produce nanoparticles having a very narrow range of particle diameters. As determined from examination of transmission electron micrographs, the particles generally have a distribution in sizes such that at least about 95 percent, and in some embodiments 99 percent, of the particles have a diameter greater than about 35 percent of the average diameter and less than about 280 percent of the average diameter. In additional embodiments, the particles generally have a distribution in sizes such that at least about 95 percent, and in some embodiments 99 percent, of the particles have a diameter greater than about 40 percent of the average diameter and less than about 250 percent of the average diameter. In further embodiments, the particles have a distribution of diameters such that at least about 95 percent, and in some embodiments 99 percent, of the particles have a diameter greater than about 60 percent of the average diameter and less than about 200 percent of the average diameter. A person of ordinary skill in the art will recognize that other ranges of uniformity within these specific ranges are contemplated and are within the present disclosure.

Furthermore, in some embodiments essentially no particles have an average diameter greater than about 5 times the average diameter, in other embodiments about 5 times the average diameter, in further embodiments 4 times the average diameter, and in additional embodiments 3 times the average diameter. In other words, the particle size distribution effectively does not have a tail indicative of a small number of particles with significantly larger sizes. This is a result of the small reaction region to form the inorganic particles and corresponding rapid quench of the inorganic particles. An effective cut off in the tail of the size distribution such that essentially no particles exceed a cutoff value indicates that there are less than about 1 particle in $10^6$ has a diameter greater than a specified cut off value above the average diameter. High particle uniformity can be exploited to form more uniform composite compositions.

In some embodiments, the composites comprise a mixture of inorganic particles that can be selected to contribute different properties to the ultimate composite. The inorganic particles generally can comprise metal elements in compounds. Specifically, the inorganic particles can comprise, for example, metal oxides, metal nitrides or combinations thereof. Metal oxide compounds are of particular interest for the composites described herein. As used herein, the term metal includes silicon, even though silicon may be considered a metalloid. Thus, silicon oxide and silicon nitride are respectively considered a metal oxide and a metal nitride.

Suitable nanoparticles can be formed, for example, by vapor-based flow processes, such as flame pyrolysis or the like, or solution-based approaches, such as sol gel approaches. Vapor-based particle production techniques in a flow can be desirable due to their flexibility with respect to product particle composition, ability to form highly crystalline particle either directly or with mild additional processing and a wide range of ability to introduce dopants. However, the resulting dry powders of particles can be more difficult to process. In particular, these particles are more difficult to disperse in a liquid. In contrast, solution-based synthesis approaches can form particles that are inherently more dispersible, but the particles can have less desirable properties due to decreased levels of crystallinity, limited compound selection and difficulties in selecting among different crystal structures.

Laser pyrolysis has been successfully used for the synthesis of a wide range of complex inorganic particles, including, for example, compositions with multiple metal elements as well as doped materials. For example, phosphor particles with desirable properties have been produced. See, for example, U.S. Pat. No. 6,692,660 to Kumar, entitled High Luminescent Phosphor Particles and Related Particle Compositions," incorporated herein by reference. Also, high quality rutile titanium oxide particles are suitable for forming composites with a high index of refraction. The formation of rutile titanium dioxide with a high degree of particle uniformity is described further in U.S. Pat. No. 6,599,631 to Kambe et al., entitled Polymer Inorganic Particle Composites," incorporated herein by reference. The synthesis of a wide range of uniform inorganic nanoparticles using laser pyrolysis is described further in published U.S. Patent Application 2003/0203205 to Bi et al., entitled "Nanoparticle Production and Corresponding Structures," incorporated herein by reference.

As explicitly noted in the '205 published patent application above, the particle compositions can include one or more metal/metalloid elements forming a crystalline or amorphous material with an optional dopant or additive. In some embodiments, such as for optical materials, powders comprise as a host material, for example, silicon particles, other metal particles, and metal/metalloid compositions, such as, metal/metalloid oxides, metal/metalloid carbides, metal/metalloid nitrides, metal/metalloid phosphides, metal/metalloid sulfides, metal/metalloid tellurides, metal/metalloid selenides, metal/metalloid arsinides and mixtures and combinations thereof. Also, silicon particles, germanium particles, or gallium arsenide particles can be formed for the introduction of semiconductor materials. Suitable non-rare earth metal dopants/additives include, for example, Al, Ga, Mg, Sr, Zn, Bi, Sb, Zr, Pb, Li, Na, K, Ba, W, Si, Ge, P, B, Te, Ca, Rb, Sn, In, Ti, Au, Ag, Ta, Mo, Nb, and the like and combinations thereof.

Flame spray pyrolysis has been demonstrated as an effective approach for the synthesis of metal oxide nano-particles having good uniformity. Flame spray pyrolysis has been described for the synthesis of uniform metal oxides in U.S. patent application Ser. No. 12/288,890 to Jaiswal et al., now published U.S. application 2010/0102700, entitled "Flame Spray Pyrolysis With Versatile Precursors for Metal Oxide Nanoparticle Synthesis and Applications of Submicron Inorganic Oxide Compositions for Transparent Electrodes," incorporated herein by reference.

Metal nitrides can be formed using laser pyrolysis through the introduction of a nitrogen source along with the exclusion of significant oxygen sources. For example, suitable nitrogen sources include, for example, $N_2$ or $NH_3$. The synthesis of $Si_3N_4$ using laser pyrolysis with silane and ammonia precursors is described in published PCT patent application WO 01/32799 to Reitz et al., entitled "Particle Dispersions," incorporated herein by reference. Other metal nitrides can be similarly synthesized.

For crystalline particles, the surface of the particle represents an abrupt termination of the crystal structure. The surface chemistry of the particles and the structure of the crystal at its surface are correlated with each other. Conceptually, simply ending the crystal structure abruptly results in free radicals or similar unstable structures due to dangling bonds. While some radicals can be stable, generally the particle surface rearranges to form chemically stable species which can have surface strain and alteration of the crystal structure near the surface.

For example, with metal oxide particles, the structure along the particle surface can have bridging oxygen atoms (—O—) or double bonded oxygen atoms (=O) to terminate the crystal structure with appropriate chemical stability. However, these structures tend to introduce a strained but relatively inert surface. Alternatively or additionally, the presence of single valent atoms, such as H or a halogen, can terminate the crystal structure with stable groups, such as M—Cl or M—O—H, where M is a metal atom of the crystal. Truncation of the crystal lattice at mono-valent atoms can reduce surface strain, result in less crystal restructuring near the particle surface and provide surface groups for later surface modification. As a result of the surface properties of these particles, they are generally better dispersed in polar liquids. Contacting the particles with water during their synthesis or subsequent to their synthesis can facilitate the formation of surface OH groups on metal oxide particle surfaces.

Because of their small size, nanoparticles tend to form loose agglomerates due to van der Waals and other electromagnetic forces between nearby particles. These loose agglomerates can be dispersed in a dispersant to a significant degree. The primary particle size, of course, is the lower limit of the secondary particle size for a particular collection of particles, so that the average secondary particle size can be approximately the average primary particle size if the primary particles are substantially unfused and if the particles are effectively completely dispersed in the liquid, although measurements of secondary particle size involves an indirect measurement that can be influenced by solvation effects.

Secondary particle size refers to the particle size in a dispersion. The secondary or agglomerated particle size may depend on the subsequent processing of the particles following their initial formation and the composition and structure of the particles. Secondary particles sizes within a liquid dispersion can be measured by established approaches, such as dynamic light scattering. Suitable particle size analyzers include, for example, a Microtrac UPA instrument from Honeywell based on dynamic light scattering, a Horiba Particle Size Analyzer from Horiba, Japan and ZetaSizer Series of instruments from Malvern based on Photon Correlation Spectroscopy. The principles of dynamic light scattering and other optical approaches for particle size measurements in liquids are well established.

The ability of a liquid to disperse particles within the liquid depends on the surface properties of the particles, the nature of the liquid dispersant, the concentration of particles and the process used to disperse the particles as well as the physical particle size. Higher concentrations of particles tend to favor agglomeration due to basic thermodynamic principles. However, proper selection of solvent/dispersant properties based on the surface properties of the particles can facilitate better dispersion. Similarly, the application of shear, sound waves and/or other mixing/disruptive forces can facilitate dispersion of the particles. The high quality inorganic particles disclosed herein under appropriate conditions can be dispersed to have secondary particle sizes approximately a few times larger than the primary particle sizes. These excellent dispersion properties can be accomplished at moderately high loadings for dry synthesized metal oxide powders, such as up to 5 weight percent inorganic powders or even higher concentrations.

It has been found that metal oxide particles produced by flow-based synthesis approaches can be well dispersed at moderate concentrations in unmodified form in alcohols, such as methanol or propylene glycol. The as-synthesized particles can be stably dispersed in water at moderate concentrations, although the average secondary particle size generally is larger than in dispersions in certain alcohols. Also, it has been discovered that the contact of the particles with water also can increase the presence of —OH groups on the surface of the particles. The increased presence of —OH groups improves the subsequent dispersion of the particles in alcohols and provides additional functional groups for bonding with surface modification agents, such as alkoxysilanes. Thus, the initial contact of the inorganic particles with water and the subsequent dispersion in a suitable alcohol results in a surprisingly improved dispersion in the alcohol. Improved dispersions are stable with a relatively small average secondary particle size at a particular concentration.

Results for dynamic light scattering (DLS) measurements of secondary particle size can be reported as an intensity average, referred to as the Z-average or cumulants mean. Alternatively, volume average particle sizes can be used to evaluate secondary particle sizes, although z-average values are generally less variable in measurements. In some embodiments, the secondary particles have a z-average size no more than about 1000 nm, in additional embodiments no more than about 500 nm, in further embodiments from about 2 nm to about 300 nm, in other embodiments about 2 nm to about 100 nm, and alternatively about 2 nm to about 50 nm. A person of ordinary skill in the art will recognize that other ranges within these specific ranges are contemplated and are within the present disclosure.

In general, the metal oxide particles formed by laser pyrolysis can be well dispersed in water or alcohols at moderate concentrations with no surface modification. Suitable alcohols include, for example, small aliphatic alcohols, such as methanol, ethanol, propylene glycol, butanediol and the like. These alcohols generally form better dispersions than water at the same concentrations. Better dispersions are more stable and/or have a smaller secondary particle size indicating less agglomeration. In general, dispersions with well dispersed particles can be formed at concentrations of up to 15 weight percent inorganic particles, in other embodiments from about 0.25 to about 10 weight percent and in further embodiments from about 0.5 to about 9 weight percent. In some embodiments, for dispersions with well dispersed particles, the average secondary particle size can be no more than a factor of four times the average primary particle size, in further embodiments no more than about 3 times the average primary particle size and in additional embodiments no more than about 2 times the average primary particle size.

The surface modification of the inorganic particles can improve stability of the particle dispersions, provide for dispersion of the particles in a wider range of liquids and provide for desired processing flexibility for the formation of composites as well as facilitating the uniform dispersion of the inorganic particles with a wider range of polymers. While surface modifiers can merely coat the surface, improved stability of the coated particles is accomplished with surface modifiers that are chemically bonded to the surface. In particular, alkoxysilanes react with metal oxides to form silicon-O-metal bonds to form a stable surface coating with the release of a corresponding compound from the displaced silane functional group. An improved surface coating is achieved with improved —OH functional group coverage on the surface of the metal oxide particles. The surface modification process can involve a switch of dispersants. For convenience of terminology, a surface modifying compound refers to a compound that adds at least 3 atoms to the particle surface when it bonds to the particle surface, to distinguish compositions, such as water, that modify the surface of a metal oxide particle such as through the substitution of an —OH group.

In particular, trialkoxysilanes provide very stable bonding to metal oxide particle surfaces with potentially three points of bonding. The fourth side chain of the trialkoxysilanes provides the ability to influence the dispersability and other surface properties of the surface modified inorganic particles. Specifically, the fourth side chain of the silane can be selected to improve disperability in a selected solvent and/or to provide a reactive functional group for further processing. Alternatively or additionally, the fourth side chain can be used to stabilize the interaction of the surface modified particle with a selected polymer so that a uniform composite can be formed. Similarly, polydialkoxy siloxy silanes provide stable bonding with the ability of each monomer unit to form two bonds to the particle. The polymer can wrap around the particles during the bonding process. In addition to alkoxy silanes, chemical compounds with other functional groups can form bonds to metal oxide particles. Specifically, compounds with chlorosilicate (—SiCl) groups, some amine groups, carboxylic acid groups and hydroxide groups can also bond to metal oxide particle surfaces. These compounds can also be expected to bond with the surfaces of metal nitride particles. Similarly, carbonyl groups, hydroxide groups and amine groups of surface modifying compounds can be expected to bond with the surfaces of metal oxide and metal nitride particles.

Two processes can be used to perform the surface modification. In one approach, an unstable, high concentration dispersion can be formed with the particles, and the surface modification is performed to stabilize the high concentration dispersion. However, better particle dispersions generally are obtained through first forming a dilute, stabile dispersion of the particles without surface modification and then performing the surface modification. As noted above, alcohols, especially propylene glycol, and water/alcohol blends are good dispersants for the unmodified metal oxide particles. The surface modifying compound can be added directly into the alcohol or water/alcohol blend if it has some solubility, or the surface modification compound can be dissolved into a solvent that is miscible with or soluble in the liquid of the particle dispersion. After the surface modification is complete, the particles can be precipitated from the dispersant by mixing a suitable liquid into the dispersion that is soluble or miscible with the dispersant used to perform the surface modification, and then re-suspended in a desired dispersant. The surface modified particles can be stored or shipped in a liquid suitable for further processing.

Polysiloxane polymers can also be referred to as silicones. Polysiloxane polymers have a chemical structure represented by $T_1$-$(OSiR_1R_2)_n$—$OT_2$ where $R_1$ and $R_2$ are independently organic side groups and $T_1$ and $T_2$ are terminal groups. In some embodiments, $R_1$ and $R_2$ are the same, while in other embodiments, $R_1$ and $R_2$ are different. Commercially available polymers include, for example, polydimethyl siloxane, polydiphenyl siloxane and polymethylphenyl siloxane. Some commercial siloxane polymers have polar groups such that the polymers are soluble in polar solvents, and one such polar polysiloxane is discussed in the Examples below.

The repeat number "n" generally is a distribution relating to the distribution of polymer chain lengths that depends on the polymerization conditions. The average value of n, <n>, is at least 2, and in some embodiments least 12, in other embodiments at least 15 and in further embodiments at least 20. The value of <n> generally can be estimated from a measurement of the average molecular weight of the polymer. Oligomers as used herein refers to polysiloxane polymers with the structure $R_1R_2R_3Si$—$(OSiR_4R_5)_nOSiR_6R_7R_8$, where $R_1$-$R_8$ are independently organic groups, wherein 0<=n<=10. The desired values of <n> and correspondingly the average polymer molecular weight can be selected based on the particular application and the desired properties of the composite for that application.

The polymers can be crosslinked, which involves chemical bonds between polymer side chains. The degree of crosslinking affects the physical properties of the polymers. In general, the polymers can be crosslinked following the formation of the composite such that the ultimate product can have a component comprising a durable composite component.

In some embodiments, polysiloxane polymers of interest have compatible functional groups that have stabilizing attractions with the inorganic particles of the composite. The nature of a compatible functional group is described further below. The compatible functional group can be at the terminal positions of the polymer. In other words, $T_1$ and/or $T_2$ have polar functional groups. If the polysiloxane polymers are synthesized through the hydrolysis of halides, $SiR_1R_2X_2$, the polymerization is limited by the availability of monomers, and the resulting terminal groups are —$SiR_1R_2X$, where X is a halogen atom. The Si—X group can be reactive for the replacement of the —X atom with another desired functional group using, for example, conventional chemical reactions. Thus, a desired compatible functional group can be placed at the terminal positions. The compatible functional groups can be located along the polymer side chains in addition or as an alternative to placing the compatible groups at the terminal positions.

In some embodiments, copolymers of polysiloxane are of interest herein with the formula $T_1$-$(SiR_1R_2)_n$ $(SiR_3R_4)_m$-$T_2$ in which $R_1$, $R_2$, $R_3$, $R_4$ or combinations thereof have compatible functional groups. These copolymers can be random copolymers so that the monomer units are randomly distributed within the polymers, although suitable block copolymers can be used similarly. The ratio n/m indicates the ratio of the average distribution of the first repeat unit with $R_1$ and $R_2$ relative to the second repeat unit with $R_3$ and $R_4$. Similarly, n and m are distributions in which the average n, <n>, and an average m, <m>, being at least 2. In some embodiments in which the polysiloxane polymers have polar functional side groups, no more than about 50 number percent of side groups have polar groups, in further embodiments no more than about 35 number percent and in some embodiments from about 5 to about 25 number percent of the side groups have polar functional groups. A person of ordinary skill in the art will recognize that additional ranges of polar functional group quantities within the explicit ranges above are contemplated and are within the present disclosure.

In some embodiments, the composite comprises a blend of two or more polysiloxane polymers. In general, at least one polymer of the polymer blend comprises compatible functional groups. The average molecular weights of the different polymers of the blend can be selected to provide desired properties for the resulting composite. In some embodiments, one of the polymers of the blend is an oligomer, and the oligomer can comprise a compatible functional group at a terminal position and/or at a side chain position. For embodiments in which there is a blend of a polysiloxane polymer and polysiloxane oligomers, the "polymer" in these embodiments refers to polysiloxane molecules with an average of at least 11 repeat units in the molecule such that oligomers compositions and polymer compositions are distinguished.

Compatible functional groups for the polymer are evaluated relative to the surface properties of the inorganic particles. In particular, if the particle surface with or without modification is polar, the compatible functional group of the polymer generally is polar. In other embodiments, the inorganic particles with or without surface modification are hydrophobic, so the compatible functional groups should be hydrophobic. In further embodiments, the inorganic particles have surface modification with an aromatic functional group so that a compatible functional group would also have an aromatic functional group. In particular, aromatic functional groups align with stable interactions.

In the examples below, it is found that metal oxide particles formed using a flow based technique have polar surface properties in an unmodified form which are compatible with polar polysiloxane polymers. Similarly, metal oxide particles modified with a surface modifying agent comprising aromatic functional groups are compatible with polysiloxane polymers comprising aromatic functional groups. These relationships also provide guidance for the formation of suitable polysiloxane polymer blends. For example, unmodified nanoparticles with a polar surface can be combined with a polysiloxane polymer blend in which at least one polymer of the blend has polar functional groups. The polysiloxane polymers tend to be compatible with each other even if they comprise different functional groups since the polymer backbones also contribute significantly to the polymer properties in a way that generally supports the compatibility of the polymers with each other. Through the use of a polymer blend the overall properties of the composite can be adjusted to achieve desired properties while still being able to stably incorporate the particles within a well dispersed composite composition.

In general, the surface chemistry of the inorganic particles can be evaluated by forming a liquid dispersion with the inorganic particles and evaluating whether or not the inorganic particles can be well dispersed within the liquid. A good dispersion is found if the inorganic particles with or without surface modification can be dispersed with at least 5 weight percent of the inorganic particles after applying good mixing conditions with the particles remaining suspended without further mixing for at least about 2 hours. Through the evaluation of the dispersability of the inorganic particles in different solvents, a person of ordinary skill in the art can correspondingly identify suitable functional groups of a polymer that would be compatible with the inorganic particles. Similarly, polymers with the functional groups often are soluble in corresponding solvents, although polymers can be more complicated due to the potential presence of portions of the polymer with different chemical properties. The polymer properties can be evaluated based on the chemical formula if it is known since the properties of particular functional groups can be evaluated by a person of ordinary skill in the art. If the chemical formula of a polymer is not know or only partially known, the properties of the polymer can also be evaluated based on its interaction with a solvent similar to the inorganic particles. While polymers can be more complicated, the solubility of a polymer in particular solvents can give significant amounts of information regarding at least some significant functional groups of the polymer.

As a particular example, metal oxide and metal nitride particles can have polar surface chemistries if appropriately synthesized and/or processed following synthesis. Polar nanoparticles can then be stabilized within a polymer with polar functional groups. Polar functional groups have a permanent electric dipole moment due to a non-uniform distribution of positive and negative charges. In general, polar functional groups of particular interest can have a dipole moment of at least about 0.5 Debye. The dipole moment of a functional group can be evaluated by replacing the polymer other than the particular functional group with a $CH_3$ group and evaluating the dipole moment of the resulting molecule. Suitable polar functional groups include, for example, —ROH, —RNH$_2$, —RSH, —RCN, —RNO, —RCOOH, and —RX, where X is F, Cl, Br or I and R is an organic group, such as an alkyl, alkenyl, alkynyl, aryl, combinations thereof, substituted forms thereof, branched formed thereof or the like. Similarly, aromatic groups associated with the particles can improve compatibility with polymers also comprising aromatic groups.

As described above, it has been discovered that there are advantages in improving the uniformity of the distribution of nanoparticles throughout the polymer within the composite. Achieving desired levels of uniformity can be facilitated through the processing to form the composite. It has been discovered that the introduction of appropriate functional groups, in particular compatible functional groups, can overcome these difficulties to achieve desired levels of uniformity of the dispersion of particles within the polysiloxane polymers. This composite engineering can result in very desirable materials that exhibit unique properties, such as a high level of transparency with a high index of refraction.

Generally, it is desirable to form good dispersions of the nanoparticles for processing into the composites. Generally, the ability to disperse the inorganic nanoparticles is significantly dependent on the selection of dispersing liquid. Generally, the selection of a good dispersing liquid depends on whether or not the nanoparticles are surface modified. It has been found that metal oxide particles produced by flow-based synthesis approaches can be well dispersed at moderate concentrations in unmodified form in alcohols, such as methanol or propylene glycol. The as-synthesized particles can be stably dispersed in water at moderate concentrations, although the average secondary particle size generally is larger than in dispersions in certain alcohols.

The performance of surface modification to obtain well dispersed surface modified particles is described further in copending U.S. patent application Ser. No. 11/645,084 to Chiruvolu et al., now U.S. Pat. No. 7,972,691, entitled "Composites of Polymers and Metal/Metalloid Oxide Nanoparticles and Methods for Forming These Composites," incorporated herein by reference. For example, alkoxysilanes can be used to covalently bonded with metal oxide particles. In some embodiments, if the particles are well dispersed prior to surface modification, correspondingly well dispersed surface modified particles can be obtained with little or no agglomeration. In general, surface modified particles can be well dispersed at higher concentrations than the unmodified particles. However, nanoparticles without surface modification can be effectively incorporated in the composites described herein with good uniformity and high loadings using the approaches described herein.

While in principle, the incorporation of well dispersed particles into a polymer composite seems straightforward, it can be complex to properly disperse the particles uniformly through the composite material. A first complication is that the solvent suitable for the polymer may not be suitable for the particle dispersion. The particle dispersions generally are very sensitive to the liquid properties. A second complication is that the particles tend to clump in the composite even if the particles are well dispersed prior to forming the composite. It has been discovered that if the polymer and inorganic particle surface properties are properly selected to be compatible, the polymer interacts in a stable way with the particles so that the particles if well dispersed in the polymer remain well dispersed. In particular, the particles can form stable formations with the polymer whether or not the particles chemically bond with the polymer. However, if the particles get significantly agglomerated, they can be difficult subsequently to disperse the particles uniformly in the polymer.

Also, the polymer molecules can have a structure in solution that can discourage incorporation of the particles into a uniform structure. For example, the polymer molecules can fold to form nanoscale polymer particles within the solution. The folding of the polymer molecules within the solution can further discourage uniform blending of the particles within the composite since only the surface of the polymer particle may be exposed. Selection of a solvent to denature tertiary structure of the polymer molecules can encourage formation of a uniform composite. The molecular weight distribution of the polymer and the concentration of the polymer determine the viscosity of the polymer solution in a selected solvent. A lower viscosity improves the mixing with inorganic particle dispersions. For a fixed molecular weight, the solvent and concentration can be adjusted to provide a viscosity in a desired range. The mixing conditions should be selected to provide an appropriate amount of time and an environment during the mixing process for macromolecules to re-configure and for particles to incorporate into the polymer macromolecules. For composite embodiments having a polymer blend, the nanoparticles can be blended first with the polymer having compatible functional groups prior to or at the time of blending with the polymer.

Furthermore, the uniformity of the composite can be significantly improved through the gradual addition of the nanoparticle dispersion to a solution of the polymer while mixing the polymer solution. The drop-wise or other gradual addition of the nanoparticle dispersion leaves a low concentration of nanoparticles within the combined solution in which the nanoparticles are not yet associated with the polymer. As inorganic nanoparticles are associated with the polymer, these particles are generally not available to form agglomerates with other inorganic nanoparticles. Thus, through the gradual addition of the nanoparticle dispersion with the polymer solution, the nanoparticles can be very uniformly distributed through the composite so that on smaller distance scales the material has the appearance of a uniform material. The appropriate slowness of the addition generally depends on the mixing conditions, and an appropriate rate of mixing can be evaluated empirically based on the teachings herein.

In some embodiments, the dispersed nanoparticles can be blended with monomers or oligomers in a solvent prior to polymerization. The polymerization can be initiated during the addition of the particle dispersion or after the particles are blended with the polymer precursors. Polymerization or crosslinking can be initiated through the addition of a reactant, such as a radical initiator, a catalyst, radiation, combinations thereof or the like.

Solvent stability issues arise with the addition of the particles to a polymer, oligomer or polymer precursor solution since the nanoparticles may not form a stable dispersion with liquids that are suitable to dissolve the polymer. In general, a dispersing liquid used for the nanoparticles can be selected to be miscible with the solvent for the polymer, oligomer or the polymer precursor. Proper selection of the solvent reduces agglomeration when the particles are added to the polymer materials. This selection of dispersing liquid improves dispersion of the particle through the solvent even for embodiments in which the particles are added gradually to the polymer solution.

Following blending the desired components of the composite, the composite can be further processed using polymer processing techniques such as casting, molding, extruding, calendering, and the like. Similarly, coating techniques can be used to apply the composite to various structures. Suitable coating techniques include, for example, extrusion, spin coating, spray coating, dip coating and the like. The solvent can be removed if desired through evaporation or other appropriate techniques.

The composite materials with improved uniformity described herein provide for significantly improved optical properties, such as refractive index matching at either higher or lower index without sacrificing the optical transmission property. In particular, since the materials can be significantly more uniform on a distance scale on the order of the wavelength of visible and/or infrared light, the composite can be significantly more transparent to light with an appropriate wavelength. While not wanted to be limited by theory, reasonable arguments suggest that increased scattering of less uniform composites results from clustering of the particles or similarly by microscopic index of refraction variations that are roughly on the order of magnitude of distances of the wavelength of light. Nevertheless, the improved uniformity of the composite achieved herein provides for a transmittance of visible light greater than 90 percent relative to the transmittance through a corresponding structure formed with the polymer without the particles, in which the structure is a 100 micron thick film.

Other optical properties of the composite can be similarly improved. For example, the formation of composites with phosphor particles can result in improved luminescence of the composites due to the improved uniformity of the materials. A desirable mixture of particles can comprise, for example, phosphor particles along with particles that increase the index of refraction. Other functional optical materials similarly have improved performance due to the improved uniformity of the composite.

EXAMPLES

Example 1

Composite Film of $TiO_2$ in AS4000 Resin

The example demonstrates the ability to form highly transparent films with a polar polysiloxane resin loaded with $TiO_2$ particles without surface modification of the inorganic particles.

Rutile $TiO_2$ Methanol Dispersion

Rutile $TiO_2$ was produced by laser pyrolysis essentially as described in Example 1 of U.S. patent application Ser. 11/645,084 filed Dec. 22, 2006 to Chiruvolu et al., entitled "Composites of Polymers and Metal/Metalloid Oxide Nanoparticles and Methods for Forming These Composites," incorporated herein by reference. The $TiO_2$ particles had a primary particle size as determined using a transmission electron micrograph of 7-10 nm, and a BET surface area>160 $m^2/g$.

Figure 1:
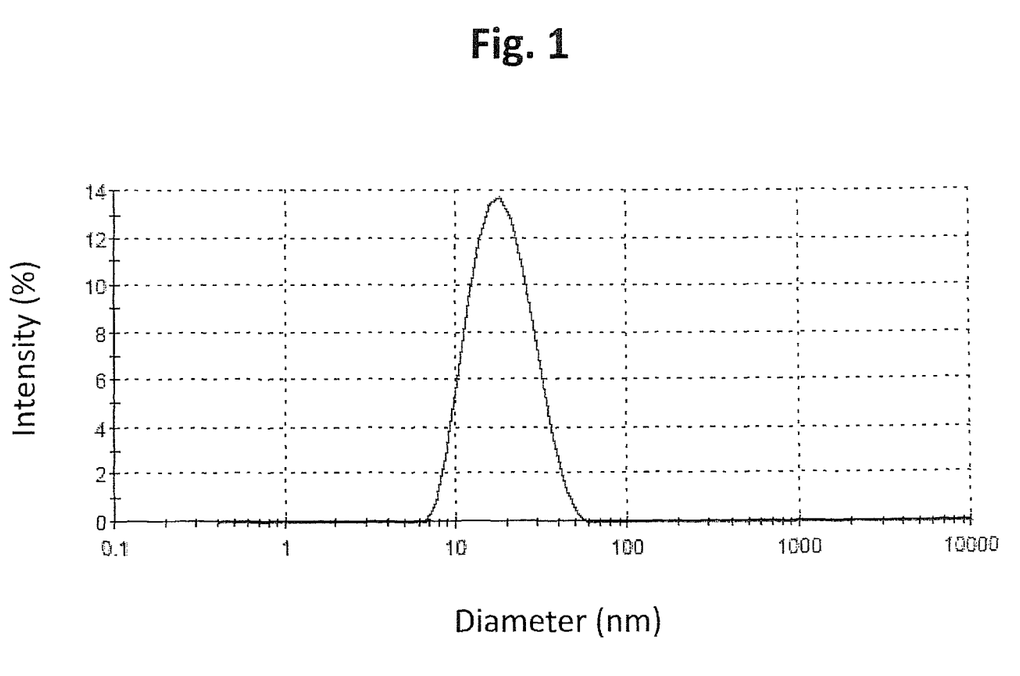
FIG. 1 is a plot of scattering intensity as a function of particle diameter based on an optical measurement of secondary particle size in a dispersion of titanium oxide particles that have not been surface modified.

$TiO_2$ particles were dispersed in methanol to form a 10% wt dispersion and milled with a Netzsch MiniCer with 0.1 mm YTZ® beads as milling media. The size of the particles in the dispersion after milling was measured with a Malvern ZetaSizer™. As shown in FIG. 1, the size of the particles in the dispersion is small, with a Z-average particle size of 16.9 nm.

AS4000 Resin

AS4000 resin is a clear, abrasion-resistant silicone hard coat resin commercially available from Momentive Performance Materials (CT, USA). Unlike some other polysiloxanes, AS4000 resin is a polar polymer that is correspondingly soluble in polar solvents. The resin obtained from the manufacturer is dispersed in a mixture of solvents including methanol, n-butanol and isopropanol.

Composite Film Preparation and Properties

Rutile $TiO_2$ methanol dispersion (10% wt) prepared above was mixed with AS4000 resin to form composites with 50% wt or 60% wt $TiO_2$. The respective composites were spin coated using a Laurell WS-400B-NPP-Lite instrument to form films on glass or a silicon wafer. The transmittance spectra of the films were taken on a SINCO UV-vis spectrometer, using a glass slide as reference. The refractive index value and the thickness of the films were measured on a SCI FilmTek 3000 instrument, with all the RI value measured at 632 nm.

Figure 2:
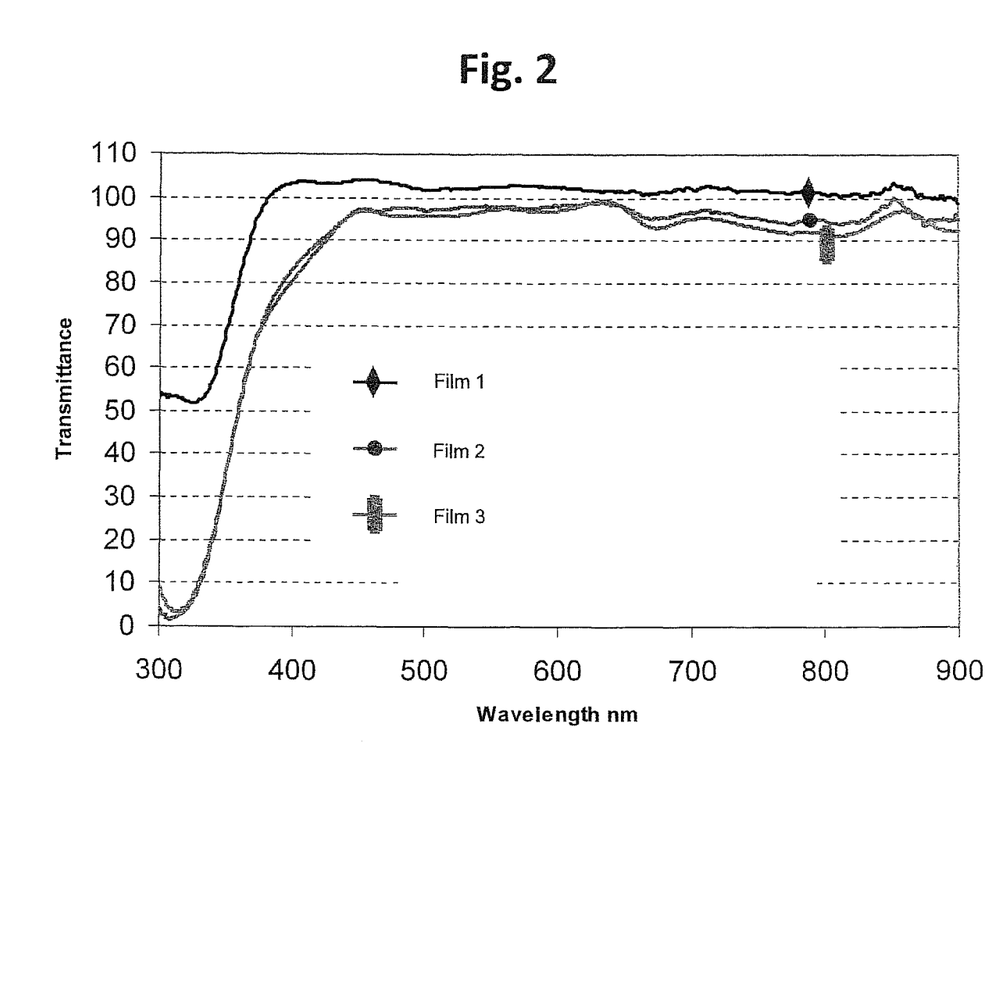
FIG. 2 is a plot of percent transmittance as a function of light wavelength for three polysiloxane films in which films 2 and 3 are composites with a 50 weight percent (film 2) or 60 weight percent (film 3) titanium oxide particles.

FIG. 2 shows the transmittance spectra of three films in visible range, all of which has higher than 90% transmittance. Film 1 is neat silicone coating of AS4000 resin without $TiO_2$ with a RI at 632 nm of 1.44. Film 2 is 50% wt $TiO_2$ composite, with a RI at 632 nm of 1.60 and a thickness of about 333 nm. Film 3 is 60% wt $TiO_2$ composite, with a RI at 632 nm of 1.66 and a thickness of about 645.4 nm.

Example 2

Composite Film of Surface Modified $TiO_2$ in Polydimethylsiloxane (PDMS)

The example is a comparative example with the highly transparent films of Example 1.

Figure 3:
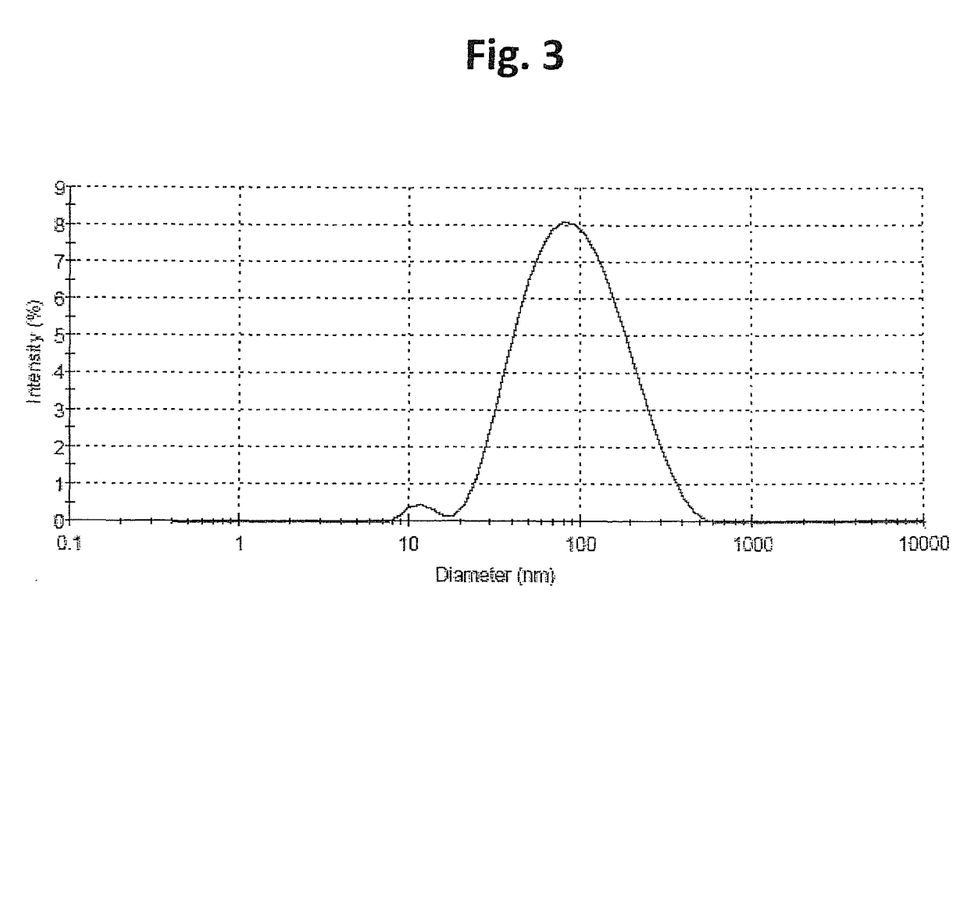
FIG. 3 is a plot of scattering intensity as a function of particle diameter based on an optical measurement of secondary particle size in a dispersion of surface modified titanium oxide particles in which the surface modification comprises hydrophobic organic groups.

$TiO_2$ Surface Modification with Hexamethyldisilazane & Octamethylcyclotetrasiloxane Rutile $TiO_2$ was produced by laser pyrolysis essentially as described in the above Example 1. A blend of hexamethyldisilazane (HMDZ, Sigma Aldrich) & octamethylcyclotetrasiloxane (D4, Gelest Inc) was used as particle surface modification reagent. Rutile $TiO_2$ was modified with HMDZ&D4 in methyl ethyl ketone (MEK) through bead milling process to produce a 3% wt dispersion following the procedure described below. $TiO_2$ was first treated with HMDZ in MEK for one hour and then introduced into a bead mill. During the milling process, HMDZ and D4 were added into the milling mixture in three steps. The resultant secondary particles sizes were evaluated with dynamic light scattering (DLS) using a Malvern ZetaSizer™ instrument. The distribution of the size of the particles revealed from DLS measurement is shown in FIG. 3 where majority of the secondary particles had a diameter of 110.2 nm. A smaller group of particles had a peak secondary particle size of about 12.45 nm. $TiO_2$ particles therefore formed a good dispersion in MEK at 3% wt after modification with HMDZ&D4.

Composite Film Preparation

A 0.7 g quantity of the surface modified $TiO_2$ dispersion in MEK prepared as described above was mixed with Gelest OE™ 41 2-part flexible optical encapsulant (OE™ 41, Gelest, Inc., main component is PDMS, part A 0.65 g and part B 0.65 g) and sonicated for 0.5 hr. The MEK was then removed by rotary-evaporation to form a liquid. The liquid was then casted as composite film on glass with a blade coater to get a 40 μm thickness. The film was then cured at 150° C. for 2 hours. The content of $TiO_2$ in the composite films was about 35% wt.

Figure 4:
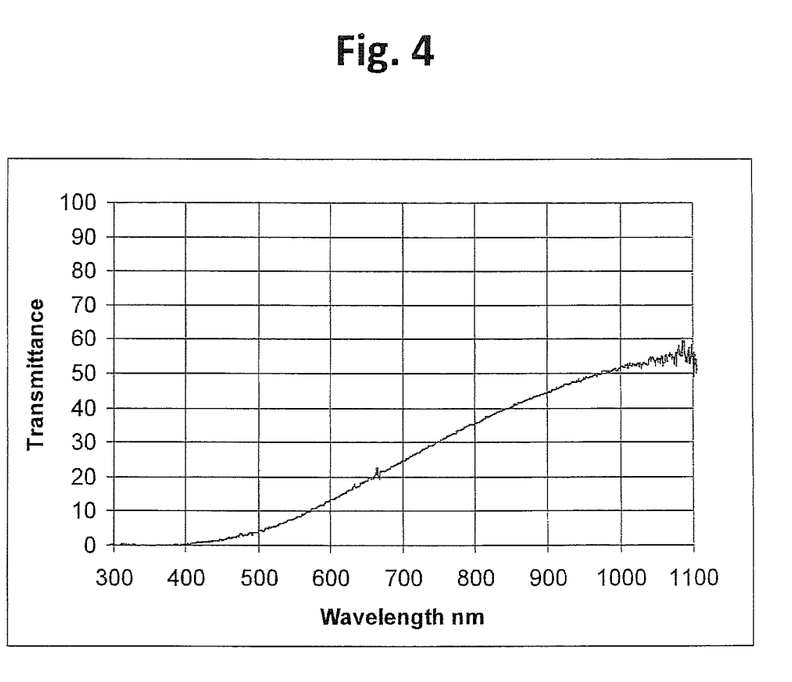
FIG. 4 is a plot of percent transmittance for composites with polysiloxane and surface modified titanium oxide formed with the surface modified particles used to obtain the data in FIG. 3.

FIG. 4 shows the transmittance spectra of the composite film. Specifically, transmittance spectra of $TiO_2$-PDMS silicone film (40 μm thickness) with loading of 35% wt $TiO_2$ was taken. The transmittance of the film in visible range is low due to poor compatibility of $TiO_2$ with PDMS even following surface modification of the titania particles. Since the functional groups of the surface modifying agents and the side groups of the polymer are hydrophobic organic groups, these results imply that the polymer backbone significantly influences the properties of the polymer. Evidently, more dominant functional groups, such as polar groups or aromatic groups, on the polymer can provide for stabilization of interactions with appropriate inorganic particles.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A good dispersion comprising a solvent, a polysiloxane and no more than about 15 weight percent inorganic particles, wherein the inorganic particles have an average particle size of no more than about 250 nm wherein the polysiloxane comprises functional side groups, wherein about 5 number percent to about 50 number percent of the functional side groups comprise aromatic functional groups and wherein the inorganic particles comprise elemental silicon.

2. The dispersion of claim 1 wherein the inorganic particles are substantially free of organic surface modification distinct from the polysiloxane.

3. The dispersion of claim 1 wherein the inorganic particles have an average particle size of no more than about 100 nm.

4. The dispersion of claim 3 wherein the inorganic particles comprise effectively no particles with a primary particle diameter greater than about 4 times the average particle size.

5. The dispersion of claim 1 wherein the inorganic particles comprise a dopant.

6. The dispersion of claim 1 wherein the inorganic particles comprise a phosphorous dopant.

7. The dispersion of claim 1 wherein the inorganic particles comprise a boron dopant.

8. The dispersion of claim 1 wherein the particles remain suspended in the dispersion for at least about 2 hours without mixing.

9. The dispersion of claim 1 wherein the z-average secondary particle size is no more than about 300 nm.

10. The dispersion of claim 1 having at least about 0.5 weight percent inorganic particles.

11. The dispersion of claim 1 wherein the z-average secondary particle size is no more than about 300 nm.

12. The dispersion of claim 1 wherein the inorganic particles are substantially free of organic surface modification distinct from polysiloxane.

13. The dispersion of claim 1 wherein the solvent comprises an alcohol.

* * * * *